US010086261B1

(12) United States Patent
Kim et al.

(10) Patent No.: US 10,086,261 B1
(45) Date of Patent: Oct. 2, 2018

(54) SYSTEM AND METHOD FOR SIMULATING PASSIVE RACING GAMES IN AN ONLINE GAME

(71) Applicant: KABAM, INC., San Francisco, CA (US)

(72) Inventors: John Kim, San Francisco, CA (US); Kevin Lee, Fremont, CA (US); Kevin Chanthasiriphan, San Francisco, CA (US); Steven Andrew Martin, Vancouver (CA); William Kim, Vancouver (CA); William Christopher Parry, Vancouver (CA)

(73) Assignee: Kabam, Inc., San Francisco, CA (US)

( * ) Notice: Subject to any disclaimer, the term of this patent is extended or adjusted under 35 U.S.C. 154(b) by 251 days.

(21) Appl. No.: 14/176,041

(22) Filed: Feb. 7, 2014

(51) Int. Cl.
| | | |
|---|---|---|
| *A61F 13/00* | (2006.01) | |
| *A63F 13/57* | (2014.01) | |
| *A63F 13/803* | (2014.01) | |
| *A63F 13/00* | (2014.01) | |

(52) U.S. Cl.
CPC .......... *A63F 13/005* (2013.01); *A63F 13/57* (2014.09); *A63F 13/803* (2014.09); *A63F 2300/65* (2013.01)

(58) Field of Classification Search
CPC ....... A63F 13/005; A63F 13/67; A63F 13/803
See application file for complete search history.

(56) References Cited

U.S. PATENT DOCUMENTS

| | | | |
|---|---|---|---|
| 8,506,410 B2 | 8/2013 | Fujisawa et al. ............... | 463/42 |
| 9,259,652 B2 * | 2/2016 | Woodman ............ | A63F 13/497 |
| 2004/0198480 A1 * | 10/2004 | Busse ................... | A63F 13/10 |
| | | | 463/6 |
| 2010/0022301 A1 * | 1/2010 | Carpenter ............. | A63F 13/12 |
| | | | 463/30 |
| 2010/0120495 A1 * | 5/2010 | Frank ................. | G07F 17/3211 |
| | | | 463/20 |
| 2013/0035158 A1 * | 2/2013 | Osvald ................. | A63F 13/795 |
| | | | 463/30 |

OTHER PUBLICATIONS

New GTA Online details URL: http://metro.co.uk/2013/10/01/new-gta-online-details-passive-mode-and-john-marston-options-4129430/, [Retrieved online on Dec. 6, 2013].
Rest—WoWWiki URL http://www.wowwiki.com/Rest, [Retrieved online on Dec. 6, 2013].
Stamina, TibiaWiki URL http://tibia.wikia.com/wiki/Stamina, [Retrieved online on Dec. 6, 2013].

* cited by examiner

*Primary Examiner* — Robert T Clarke, Jr.
(74) *Attorney, Agent, or Firm* — Sheppard Mullin Richter & Hampton LLP (57) ABSTRACT

An online game is provided to players where players may participate in individual episodes of the online racing game. The individual episodes may include individual races within the racing game in which players control game entities through racecourses. User accounts comprising an indication of game entities associated with the players of the online game, an indication of a status of the player, and a game play metric associated with the player may be managed. Races in the online game may be synthesized by simulating participation by game entities of a player in individual synthetic episodes of the online game while the player is absent from the online game. A change in the game play metric of the player may be determined based on the performance of the first game entity in the race of the first synthetic episode.

14 Claims, 3 Drawing Sheets

SYSTEM AND METHOD FOR SIMULATING PASSIVE RACING GAMES IN AN ONLINE GAME

FIELD OF THE DISCLOSURE

This disclosure relates advancing player progress in an online game, and specifically synthesizing races in an online game while the player is absent from the online game.

BACKGROUND

Online games and player participation in online games through client computing platforms is known. Online racing games are known where a player logs into an online game and is presented with one or more virtual vehicles to choose from and race against player-controlled and non-player-controlled vehicles.

Providing the player points based on the outcomes of the races in which the player participates is also known. Players my receive awards, points, virtual currency, virtual items and/or other items in response to participating in the online racing game. Players may receive more awards, points, virtual currency, virtual items and/or other items in response to winning the race or finishing the race in one or more of the lead positions, such as second, third and/or other positions.

SUMMARY

One aspect of the disclosure relates to simulating races including a player's game entities while the player is absent from the online game and/or not playing with such game entities. Based on the outcome of the one or more simulated races the player may receive one or more of awards, points, virtual currency, virtual items, and/or other benefits. The player may receive an indication of the amount of awards, points, virtual currency, virtual items, and/or other benefits received while the player has been absent from the online game and/or not playing with the specific game entity when the player becomes present in the online racing game. For example, the number of wins, losses, or the placement of the player's game entity in the simulated races may correspond to an amount of awards, points, virtual currency, virtual items, and/or other benefits which become available to the player once the player accesses the online game after being absent.

Points awarded to players may include skill points, progress points, experience points, and/or other forms of points, wherein the points may translate to a position on a leaderboard and/or comparison with other players of the online game.

Simulating races while the player is absent from the online game and providing the player with a notification of the amount of awards, points, virtual currency, virtual items, and/or other benefits received when the player has been absent from the online game incentivizes the player to access the online game more frequently, thereby retaining the player's interest in the online game, increasing the likelihood of receiving revenue for the online game provider.

In some implementations, multiple simulated races using multiple game entities off the player may be conducted simultaneously. The more game entities a player has accumulated, the more simulated races the player's game entities may participate in and the more awards, points, virtual currency, virtual items, and/or other benefits the player may obtain. As a result, players of the online racing game are incentivized to accumulate game entities. An online game provider may provide game entities to the players. The game entities may have an associated player cost, wherein the associated player cost is an amount of virtual currency, real currency, and/or other item having a real world value. Incentivizing players to accumulate game entities having a real world value increases revenue for the online game provider.

One aspect of the disclosure relates to a system that advances player progress in an online game. The system may comprise one or more physical processors that are configured by machine-readable instructions to facilitate player participation in individual episodes of an online racing game, the individual episodes including individual races within the racing game in which players control game entities through racecourses. Individual episodes of an online game may include discrete events within the online game. For example, in the case of an online racing game, individual episodes may include individual races in the online game racing game.

The one or more physical processors may be configured by machine-readable instructions to manage player accounts. The player accounts may include an indication of game entities associated with the players of the online game, an indication of a status of the player, and a game play metric associated with the player, such that the player accounts include a first player account for a first player having an indication of a first game entity associated with the first player, an indication of the status of the first player, an indication of the first game metric of the first player, and/or other metrics and/or parameters associated with the player of the online game.

Game entities may include, but are not limited to, animal mounts, cars, planes, boats, semi-trucks, SUVs, trucks, and/or other game entities. Associations between the game entities, and between the game entities and online game player, other online game players, the game entities of other online players, non-player-controlled game entities may be persistent. Where relationships associated with game entities are persistent, the relationships exist even after the player has left the game and is absent from the online game.

The game play metric may include one or more of the virtual currency held in credit for the player, the experience points of the player, the respect points of the player, the skill-level of the player, the progress points of the player, the level of the player, the virtual items in an inventory of the player, the rank of the player compared to other players of the online game and/or other game play metrics of the player.

The one or more physical processors may be configured by machine-readable instructions to synthesize races in the online game. Synthesizing races in the online game may include simulating participation by the first game entity in individual synthetic episodes of the online game while the player is absent from the online game. The simulation of a first synthetic episode may include a race in which the performance of the first game entity is determined stochastically or quasi-stochastically.

The one or more physical processors may be configured by machine-readable instructions to determine a change in the game play metric of the player based on the performance of the first game entity in the race of the first synthetic episode. For example, the player may receive an amount of virtual currency based on the performance of the first game entity, such as a car, in the race of the first synthetic episode.

The one or more physical processors may be configured by machine-readable instructions to update the game play metric of the player in the player account associated with the player with the determined change in the game play metric of the player. For example, if the player's first game entity won the synthesized race, the player may be awarded 100 credits of virtual currency. In response, the amount of virtual currency held in credit for the player may be updated by the addition of 100 credits.

The performance of the first game entity may be determined without input or control from the first player. The first game entity may have one or more performance metrics, and the performance of the first game entity may be determined based on the one or more performance metrics of the first game entity. The one or more performance metrics of the first game entity may comprise a speed metric, a cornering ability metric, an artificial intelligence metric, an age metric, a damage metric, and/or other metrics.

The one or more processors may be further configured to effectuate presentation of an indication of the change in game play metric of the player in response to an indication that the player has accessed the online game. A player interface may be configured to facilitate displaying a notification to the player of a change in the one or more game play metrics of the player, and/or to facilitate displaying a notification to the player of the total of one or more game play metrics of the player, in response to the player accessing the online game.

The amount of change in the game play metric of the player may vary with the amount of time that the player is absent from the online game. For example, if the player accesses the game daily, the change in game play metric may be equal to the change in game play metric associated with one or more synthetic races performed by the system while the player was absent from the online game. If the player accesses the game less than daily, the change in the game play metric may be less than the amount equal to the change in game play metric associated with one or more synthetic races performed by the system while the player was absent from the online game.

The amount of change in the game play metric may decrease as the amount of time that the player is absent from the online game increases. A player may receive the maximum possible change in the one or more game play metrics of the player if the player accesses the online game regularly. The longer the intervals that the player is absent from the online game, the greater the amount of loss from the maximum possible change in the one or more game play metrics.

The one or more physical processors may be configured to present offers to the players; the offers including sets of one or more game entities usable in the online game, wherein the one or more game entities have one or more attributes affecting performance of the game entities in the synthesized races. The offers may include an associated player cost, wherein the associated player cost varies with the level of the one or more attributes of the game entity. The one or more attributes of the first game entity may comprise a speed metric, a cornering ability metric, an artificial intelligence metric, an age metric, a damage metric, and/or other metrics. The higher the level of the one or more attributes of the game entity, the higher the associated player cost for the game entity.

The change in the game play metric of the player may increase with an increased level of the one or more attributes of the game entity. The higher the level of the one or more attributes of the game entity, the more value the player will have to exchange to obtain the game entity, and the greater the potential gain in synthetic races performed by the system when the player is absent from the online game. The associated player cost may include an amount of real currency, virtual currency, virtual items, and/or item of value.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
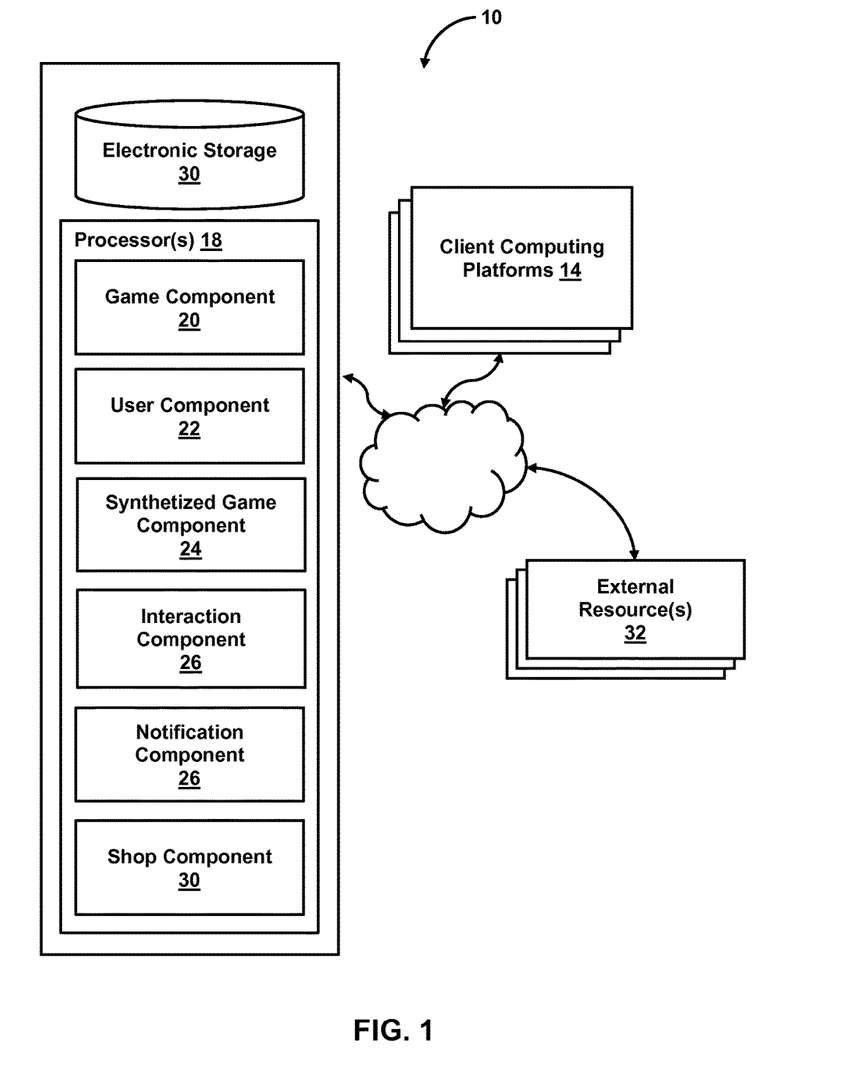
FIG. 1 illustrates a system that advances progress in an online game, in accordance with one or more implementations.

FIG. 1 illustrates a system 10 that advances progress in an online game, in accordance with one or more implementations. The system may be configured to provide a virtual space to users, wherein individual episodes of the online game are performed within the virtual space. The virtual space may include hosting the virtual space over a network. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute one or more computer program components. The computer program components may include one or more of a game component 20, user component 22, synthesized game component 24, interaction component 26, notification component 28, shop component 30 and/or other components.

The server 12, client computing platforms 14, and/or external resources 32 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or external resources 32 may be operatively linked via some other communication media.

A given client computing platform 14 may include one or more processors configured to execute computer program components. The computer program components may be configured to enable an expert or user associated with the given client computing platform 14 to interface with system 10 and/or external resources 32, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The external resources 32 may include sources of information, hosts and/or providers of virtual environments outside of system 10, external entities participating with system 10, and/or other resources. In some implementations, some or all of the functionality attributed herein to external resources 32 may be provided by resources included in system 10.

The server 12 may include electronic storage 34, one or more processors 18, and/or other components. The server 12 may include communication lines or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 34 may comprise electronic storage media that electronically stores information. The electronic storage media of electronic storage 34 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 34 may include one or more virtual storage resources (e.g., cloud storage, a virtual private network, and/or other virtual storage resources). Electronic storage 34 may store software algorithms, information determined by processor 18, information received from server 12, information received from client computing platforms 14, and/or other information that enables server 12 to function as described herein.

Processor(s) 18 is configured to provide information processing capabilities in server 12. As such, processor 18 may include one or more of a digital processor, an analog processor, a digital circuit designed to process information, an analog circuit designed to process information, a state machine, and/or other mechanisms for electronically processing information. Although processor 18 is shown in FIG. 1 as a single entity, this is for illustrative purposes only. In some implementations, processor 18 may include a plurality of processing units. These processing units may be physically located within the same device, or processor 18 may represent processing functionality of a plurality of devices operating in coordination. The processor 18 may be configured to execute components 20, 22, 24, 26, 28, 30, and/or other components. Processor 18 may be configured to execute components 20, 22, 24, 26, 28, 30, and/or other components by software; hardware; firmware; some combination of software, hardware, and/or firmware; and/or other mechanisms for configuring processing capabilities on processor 18.

It should be appreciated that although components 20, 22, 24, 26, 28, 30 are illustrated in FIG. 1 as being co-located within a single processing unit, in implementations in which processor 18 includes multiple processing units, one or more of components 20, 22, 24, 26, 28, 30, and/or other components may be located remotely from the other components. The description of the functionality provided by the different components 20, 22, 24, 26, 28, 30, and/or other components described below, is for illustrative purposes, and is not intended to be limiting, as any of components 20, 22, 24, 26, 28, 30, and/or other components may provide more or less functionality than is described. For example, one or more of components 20, 22, 24, 26, 28, 30, and/or other components may be eliminated, and some or all of its functionality may be provided by other ones of components 20, 22, 24, 26, 28, 30, and/or other components. As another example, processor 18 may be configured to execute one or more additional components that may perform some or all of the functionality attributed below to one of components 20, 22, 24, 26, 28, 30, and/or other components.

The game component 20 may be configured to implement the instance of the virtual space executed by the computer components to determine state of the virtual space. The state may then be communicated (e.g., via streaming visual data, via object/position data, and/or other state information) from server 12 to client computing platforms 14 for presentation to users. The state determined and transmitted to a given client computing platform 14 may correspond to a view for a user character being controlled by a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The system 10 may comprise one or more physical processors 18 that are configured by machine-readable instructions to facilitate player participation in individual episodes of an online racing game. The individual episodes may include individual races within the racing game in which players control game entities through racecourses. Individual episodes of an online game may include discrete events within the online game. For example, in the case of an online racing game, individual episodes may include individual races in the online game racing game.

The above description of the manner in which state of the virtual space is determined by game component 20 is not intended to be limiting. The game component 20 may be configured to express the virtual space in a more limited, or more rich manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game component 20, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through game component 20).

The user component 22 may be configured to access and/or manage one or more user profiles and/or user information associated with users of the system 10. The one or more user profiles and/or user information may include information stored by server 12, one or more of the client computing platforms 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user component 20 may be configured to manage player accounts. The player accounts may include an indication of game entities associated with the players of the online game, an indication of a status of the player, and a game play metric associated with the player, such that the player accounts include a first player account for a first player having an indication of a first game entity associated with the first player, an indication of the status of the first player, an indication of the first game metric of the first player, and/or other metrics and/or parameters associated with the player of the online game.

Game entities may include, but are not limited to, animal mounts, cars, planes, boats, semi-trucks, SUVs, trucks, and/or other game entities. Associations between the game entities, and between the game entities and online game player, other online game players, the game entities of other online players, non-player-controlled game entities may be persistent. Where relationships associated with game entities are persistent, the relationships exist even after the player has left the game and is absent from the online game.

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

The game play metric may include one or more of the virtual currency held in credit for the player, the experience points of the player, the respect points of the player, the skill-level of the player, the progress points of the player, the level of the player, the virtual items in an inventory of the player, the rank of the player compared to other players of the online game and/or other game play metrics of the player.

The synthesized game component 24 may be configured to synthesize races in the online game. Synthesizing races in the online game may include simulating participation by the first game entity in individual synthetic episodes of the online game while the player is absent from the online game.

The synthesized game component 24 may be configured to determine the outcome of the individual synthetic episode and/or the performance of the first game entity in the individual synthetic episodes stochastically or quasi-stochastically, such that the outcome of the first synthetic episode and/or the performance of the first game entity in the first synthetic episode is determined stochastically or quasi-stochastically.

The synthesized game component 24 may be configured to determine the outcome of the individual synthetic episodes, or races, of the online game by generating an outcome for the synthetic episode, or race. The synthesized game component 24 does not necessarily run the game entities through the synthetic episode, or racecourse, using artificial intelligence applications. The outcomes of the synthesized episodes, or races, may be determined from one or more sets of probabilities, and/or other mechanisms for stochastically determining the outcomes of the one or more synthetic episodes, or races.

In some implementations, the synthetic game component 24 may be configured to determine the outcome of the first synthetic episode and/or the performance of the first game entity in the first synthetic episode based on one or more predefined parameters. The one or more predefined parameters and/or metrics may be a status or level of the player of the online game, an activity metric of the player, a purchase and/or spend history of the player in the online game and/or other online games, and/or other parameters and/or metrics. For example, a player may have a purchase and/or spend history indicating that the player has a propensity to purchase and/or spend virtual currency. The synthetic game component 24 may be configured to determine a performance of the first game entity in the first synthetic episode such that the first game entity does not place significantly high in the race indicating a poor performance of the first game entity. Such a result may incentivize the player having a propensity to purchase and/or spend virtual currency to purchase upgrades for the first game entity and/or purchase one or more game entities with a greater likelihood of placing highly in individual episodes of the online racing game.

The synthesized game component 24 may be configured to determine a change in the game play metric of the player based on the performance of the first game entity in the race of the first synthetic episode. For example, the player may receive an amount of virtual currency based on the performance of the first game entity, such as a car, in the race of the first synthetic episode.

The user component 22 may be configured to update the game play metric of the player in the player account associated with the player, with the determined change in the game play metric of the player. For example, if the player's first game entity won the synthesized race, the player may be awarded 100 credits of virtual currency. In response, the amount of virtual currency held in credit for the player may be updated by the addition of 100 credits.

The performance of the first game entity in the first episode of the online game may be determined without input or control from the first player. When the user is absent from the online game, the synthesized game component 24 may be configured to synthesize races in the online game by simulating participation by the first game entity in individual synthetic episodes of the online game while the player is absent from the online game.

The performance of the first game entity may be determined on one or more metrics of the first game entity. The one or more metrics of the first game entity may comprise a speed metric, a cornering ability metric, an artificial intelligence metric, an age metric, a damage metric, and/or other metrics. A game entity having one or more higher metrics may have improved performance in individual episodes of the online racing game compared to a game entity having one or more lower metrics. The set of probabilities used by the synthesized game component 24 may be based, in whole or in part, on the one or more metrics of the game entities participating in the one or more synthesized episodes, or races, of the online game. The synthesized game component 24 may be configured to determine an outcome of individual ones of the synthesized episodes of the online game based on the one or more sets of probabilities that are based on the one or more metrics of the game entities participating in the one or more synthesized episodes. The synthesized game component 24 does not necessarily cause the game entities to run through synthesized episodes of the online game, but may merely determine the outcomes.

Figure 2:
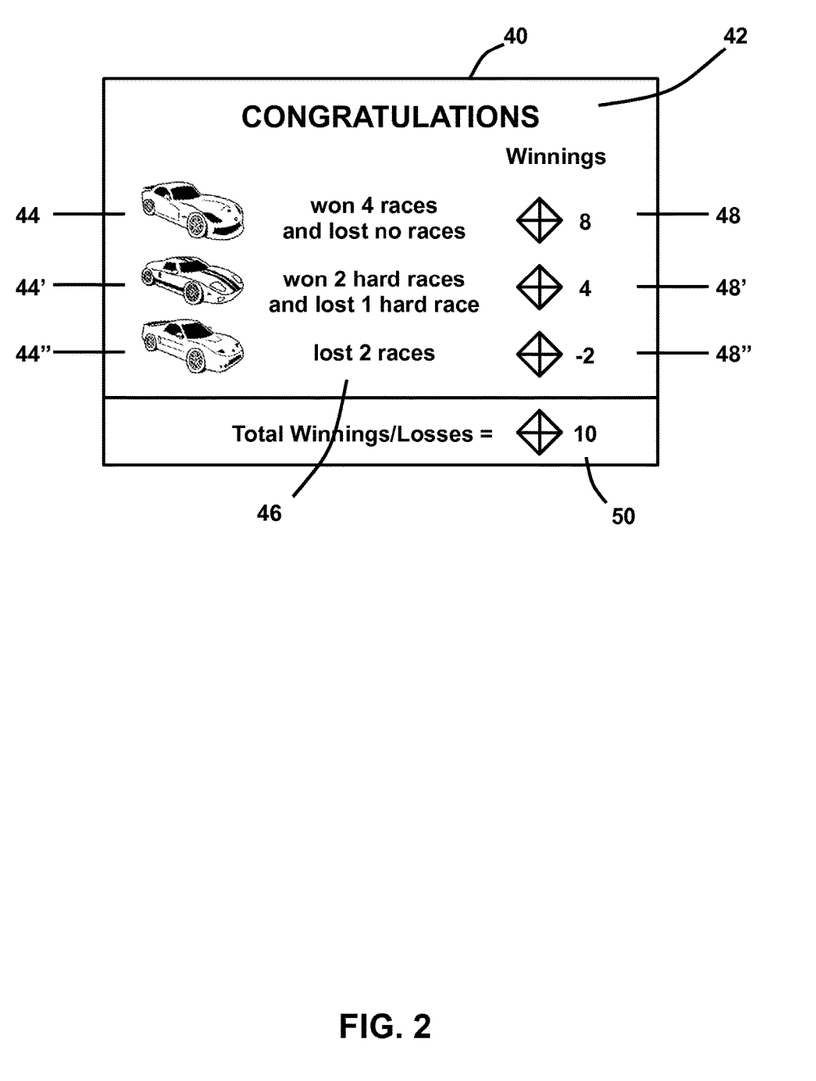
FIG. 2 illustrates a user interface for presenting a notification to the player, in accordance with one or more implementations.

The notification component 28 may be configured to effectuate presentation of an indication of the change in game play metric of the player in response to an indication that the player has accessed the online game. FIG. 2 illustrates a user interface 40 for presenting a notification to the player of a change in a game play metric associated with the player. A player interface 40 may be configured to facilitate displaying a notification 48, 48', 48" to the player of a change in the one or more game play metrics of the player, and/or to facilitate displaying a notification to the player of the total award 50 of one or more game play metrics of the player, in response to the player accessing the online game.

The user interface 40 may comprise a greeting 42 informing the player that they have an increase in one or more game play metrics. While the player has been absent from the online game, the synthetic game component may have simulated participation by one or more game entities of the player in multiple individual synthetic episodes of the online game. The example illustrated in FIG. 2 displays a first game entity 44 and an outcome notification 46 of the individual episodes that the first game entity 44 participated in while the player was absent from the online game. Additionally, the user interface 40 provides a first game play metric indication 48 of the increase in the game play metric of the player attributable to the performance of the first game entity 44.

As illustrated, the first game entity 44 won four individual simulated episodes of the online game and lost no individual simulated episodes of the online game, which resulted in a first award 48 of an increase of eight gems. The second game entity 44' won two advanced individual simulated episodes of the online game and lost one advanced individual simulated episodes of the online game, which resulted in a second award 48' of an increase of 4 gems. The third game entity 44" won no individual simulated episodes of the online game and lost two individual simulated episodes of the online game, which resulted in a third award 48" of a decrease of 2 gems. The user interface 40 may be configured to provide an indication of a total award 50 being the sum of the first award 48, second award 48', and third award 48".

Individual episodes may be easy, standard, or advanced individual episodes. Easy episodes of the online game may result in a greater likelihood that the game entity participating in the easy episode will win and/or place highly in the episode. However, the award for winning and/or placing highly in the easy episode may not be as high as winning and/or placing highly in a standard or hard episode. Similarly, winning and/or placing highly in a hard episode may result in a greater award than in easy or standard episodes.

The amount of change in the game play metric of the player may vary with the amount of time that the player is absent from the online game. The amount of change in the game play metric may decrease as the amount of time that the player is absent from the online game increases. A player may receive the maximum possible change in the one or more game play metrics of the player if the player accesses the online game regularly. The longer the intervals that the player is absent from the online game, the greater the amount of loss from the maximum possible change in the one or more game play metrics.

For example, if the player accesses the game daily, the change in game play metric may be equal to the change in game play metric associated with one or more synthetic races performed by the system while the player was absent from the online game. If the player accesses the game less than daily, the change in the game play metric may be less than the amount equal to the change in game play metric associated with one or more synthetic races performed by the system while the player was absent from the online game.

As illustrated in FIG. 2, the total award 50 illustrating the increase in game play metric for the first player while the first player has been absent from the online game may decrease with the amount of time that the player is absent from the online game. If the user is absent from the online game for a defined period of less than a defined period of time, the player may receive the maximum change in game play metric. The maximum change in game play metric may be ten gems. If the player is absent from the online game for a period of time greater than the defined period of time, the change in game play metric may reduce, such as by one gem for every hour over the defined period of time that the player is absent from the online game. Reducing the change in game play metric as the period of absence from the online game increases provides an incentive for the player to access the game frequently and remain engaged with the online game, thereby increasing the likelihood of generating revenue from the player.

The notification component 26 may be configured to facilitate presentation to players of the online game accessed through system 10, a notification of the outcome of the one or more synthesized episodes of the online game. The outcomes presented to individual ones of the players may include the outcomes of the synthesized episodes, or races, that the game entities associated with the individual player participated in. For example, the notification component 26 may be configured to facilitate presentation to a first player of the outcomes of the one or more synthesized episodes, or races, that the first game entity, a second game entity, and a third game entity, associated with the first player, participated in.

The synthesized game component 24 may be configured to synthesize races in the online game by simulating participation in individual episodes of the online game by game entities of multiple ones of players that have an indication of having one or more common relationships in the virtual space. The synthesized game component 24 may be configured to select multiples ones of players, having one or more common relationships, based on an indication that the multiple ones of players are absent from the online game, such that only the game entities of those players that are absent from the online game participate in the synthetic episodes or races.

When the notification component 26 facilitates presentation of the outcomes of the synthesized episodes of the online game to the player when the player accesses the online game the player may be presented a notification of their game entity's performance relative to the game entities of players with whom they have one or more common relationships. Such notifications may incentivize players to upgrade their game entities to increase the likelihood that their game entities will perform better in subsequent synthetic episodes against players with whom they have one or more common relationships. Players may be required to purchase upgrades for their game entities through a virtual shop associated with the online game.

The shop component 30 may be configured to present offers to the players. The offers including sets of one or more game entities usable in the online game, wherein the one or more game entities have one or more metrics affecting performance of the game entities in the synthesized races. Offers may include an option to upgrade the one or more game entities associated with player, such that the offers may include an option to upgrade the one or more metrics affecting performance of the game entities associated with the player. Offers may include an option to modify the one or more game entities associated with the player, where such modification has no effect on the performance of the game entity in the synthesized episodes, or races. For example, offers may include an option to modify the appearance of the game entity, sell the game entity, and/or other offers. The offers may include an associated player cost, wherein the associated player cost varies with the level of the one or more metrics and/or the one or more metrics of the game entity. The one or more metrics of the first game entity may comprise a speed metric, a cornering ability metric, an artificial intelligence metric, an age metric, a damage metric, and/or other metrics. In some implementations, the higher the level of the one or more metrics of the game entity, the higher the associated player cost for the game entity.

The change in the game play metric of the player may increase with an increased level of the one or more metrics of the game entity. The higher the level of the one or more metrics of the game entity, the more value the player will have to exchange to obtain the game entity and the greater the potential gain in synthetic races performed by the system when the player is absent from the online game. The associated player cost may include an amount of real currency, virtual currency, virtual items, resources, benefit and/or other item of value.

The interaction component 26 may be configured to determine a status of players of the online game such that the interaction component 26 may be configured to determine an absence, by the first player, from the online game. The interaction component 26 may be configured to monitor interactions of the users with the virtual space and/or each other within the virtual space. This may include monitoring, for a given user, one or more of times at which the given user is logged in to the virtual space, areas of the virtual space the given user views or interacts with or in other users the given user interacts with, the nature and/or content of interactions of the given user with other users, activities participated in within the virtual space, level, powers or skill attained in the virtual space, inventory items obtained in the virtual space, and/or other interactions of the given user with the virtual space and/or other users. Some or all of the information generated by interaction component 26 in monitoring the interactions of the users may be stored to the user profiles managed by user component 22.

At a given time, interaction component 26 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction component 26 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The interaction component 26 may be configured to determine whether the user is absent from the online game or present in the online game. When the user is present in the online game, the interaction component 26 may be configured to determine which individual one, if any, of the game entities associated with the player, the player is using to participate in an episode of the online game.

Figure 3:
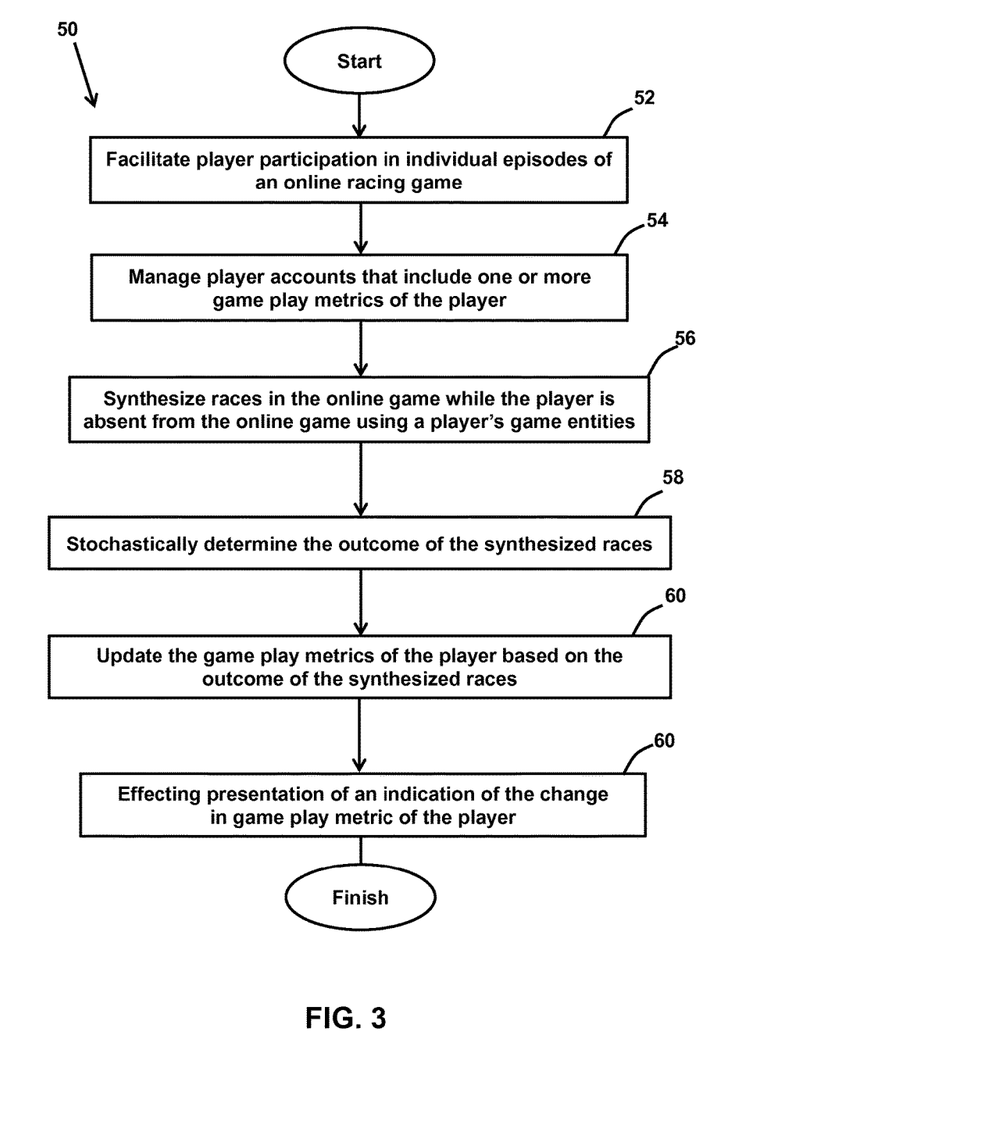
FIG. 3 illustrates a method for advancing progress in an online game, in accordance with one or more implementations.

FIG. 3 illustrates a method 50 for advancing progress in an online game in accordance with one or more implementations. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 3 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, player participation in individual episodes of an online racing game may be facilitated. The individual episodes may include individual races within the racing game in which players control game entities through racecourses. Such operations may be performed by a game component, such as game component 20 in accordance with one or more implementations.

At an operation 54, player accounts may be managed. The player accounts may include an indication of game entities associated with the players of the online game, an indication of a status of the player, and a game play metric associated with the player, such that the user accounts include a first player account for a first player having an indication of a first game entity associated with the first player, an indication of the status of the first player, and an indication of the first game metric of the first player. Such operations may be performed by a user component, such as user component 22, in accordance with one or more implementations.

The game play metric represents an indication of an amount of virtual currency held in credit for the player, a rank of the player compared to other players in the online racing game, and/or other game play metrics.

At an operation 56, races in the online game may be synthesized. Races in the online game may be synthesized by simulating participation by the first game entity in individual synthetic episodes of the online game while the player is absent from the online game. The simulation of a first synthetic episode may include a race in which the performance of the first game entity is determined stochastically. Such operations may be performed by a synthesized game component, such as synthesized game component 24 in accordance with one or more implementations.

At an operation 58, a change in the game play metric of the player may be determined. The change in the game play metric may be based on the performance of the first game entity in the race of the first synthetic episode. The performance of the first game entity is determined without input or control from the first player. The first game entity may have one or more performance metrics, and the performance of the first game entity may be determined based on the one or more performance metrics of the first game entity. Such operations may be performed by a synthesized game component, such as synthesized game component 24 in accordance with one or more implementations.

At an operation 60, the game play metric of the player may be updated with the determined change in the game play metric of the player. Such operations may be performed by a user component, such as user component 22 in accordance with one or more implementations.

At an operation 62, presentation of an indication of the change in game play metric of the player may be effectuated in response to an indication that the player has accessed the online game. The amount of change in the game play metric of the player varies with the amount of time between that the player is absent from the online game. The amount of change in the game play metric decreases as the amount of time that the player is absent from the online game. Such operations may be performed by a notification component, such as notification component 28 in accordance with one or more implementations.

Other operations may comprise presenting offers to the players. The offers may include sets of one or more game entities usable in the online game, wherein the one or more game entities have a benefit parameter in the synthesized races in the online game. Such offers may include an associated user cost, wherein the associated user cost varies with the level of the benefit parameter of the associated game entity. Such components may be performed by a shop component, such as shop component 30, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system that simulates player participation in an online game while the player does not have an active communication session open with the online game, the system comprising:
one or more game servers comprising:
one or more physical processors configured by machine-readable instructions to:
facilitate player participation in individual episodes of an online racing game by performing operations in the online game in response to receiving commands transmitted over a network from one or more client computing platforms associated with players of the online game while the one or more client computing platforms have active communication sessions open with the one or more game servers, the individual episodes including individual races within the online racing game in which the players control game entities through racecourses;

manage player accounts, wherein the player accounts include an indication of game entities associated with the players of the online game, an indication of a status of an individual player, and a game play metric associated with the individual player, such that the user accounts include a first player account for a first player having an indication of a first game entity associated with the first player, an indication of a status of the first player, and an indication of a first game play metric associated with the first player;

present offers to the players, the offers including sets of one or more game entities usable in the online game, wherein the one or more game entities have associated user costs and one or more benefit parameters in the individual races, wherein the associated user costs vary with levels of the one or more benefit parameters;

synthesize races in the online game by:
(i) simulating participation by the first game entity in individual synthetic episodes of the online racing game while no client computing platform associated with the first player has an active communication session open with the one or more game servers, the simulation of a first synthetic episode including a race in which performance of the first game entity is determined stochastically; and
(ii) determining a change, caused by an outcome of the race in the first synthetic episode, in the first game play metric of the first player based on the performance of the first game entity in the race included in the first synthetic episode, wherein an amount of the change in the first game play metric of the first player caused by the outcome of the race varies with an amount of time between active communication sessions between any client computing platforms associated with the first player and the one or more game servers, and wherein the amount of the change increases with an increased level of a benefit parameter of the first game entity; and update the first game play metric of the first player with the determined change in the first game play metric of the first player.

2. The system of claim 1, wherein the performance of the first game entity is determined without input or control from the first player.

3. The system of claim 1, wherein the first game entity has one or more performance metrics, and the performance of the first game entity is determined by the one or more performance metrics of the first game entity.

4. The system of claim 1, wherein the one or more processors are further configured to effectuate presentation of an indication of the change in the first game play metric of the first player in response to an indication that the first player has an active communication session open with the one or more game servers.

5. The system of claim 1, wherein the amount of the change in the first game play metric decreases as an amount of time that the first player does not have an active communication session open with the one or more game servers increases.

6. The system of claim 1, wherein the first game play metric represents an indication of an amount of virtual currency held in credit for the first player.

7. The system of claim 1, wherein the first game play metric represents an indication of a rank of the first player compared to other players in the online racing game.

8. A method for simulating player participation in an online game while the player does not have an active communication session open with the online game, the method performed by one or more game servers comprising of one or more physical processors, the method comprising:

facilitating player participation in individual episodes of an online racing game by performing operations in the online game in response to receiving commands transmitted over a network from one or more client computing platforms associated with players of the online game while the one or more client computing platforms have active communication sessions open with the one or more game servers, the individual episodes including individual races within the online racing game in which the players control game entities through racecourses;

managing player accounts wherein the player accounts include an indication of game entities associated with the players of the online game, an indication of a status of an individual player, and a game play metric associated with the player, such that the user accounts include a first player account for a first player having an indication of a first game entity associated with the first player, an indication of a status of the first player, and an indication of a first game play metric associated with the first player;

presenting offers to the players, the offers including sets of one or more game entities usable in the online game, wherein the one or more game entities have associated user costs and one or more benefit parameters in the individual races, wherein the associated user costs vary with levels of the one or more benefit parameters;

synthesizing races in the online game by:
(i) simulating participation by the first game entity in individual synthetic episodes of the online racing game while no client computing platform associated with the first player has an active communication session open with the one or more game servers, the simulation of a first synthetic episode including a race in which performance of the first game entity is determined stochastically; and
(ii) determining a change, caused by an outcome of the race in the first synthetic episode, in the first game play metric of the first player based on the performance of the first game entity in the race included in the first synthetic episode, wherein an amount of the change in the first game play metric of the first player caused by the outcome of the race varies with an amount of time between active communication sessions between any client computing platforms associated with the first player and the one or more game servers, and wherein the amount of the change increases with an increased level of a benefit parameter of the first game entity; and updating the first game play metric of the first player with the determined change in the first game play metric of the first player.

9. The method of claim 8, wherein the performance of the first game entity is determined without input or control from the first player.

10. The method of claim 8, wherein the first game entity has one or more performance metrics and the performance of the first game entity is determined based on the one or more performance metrics of the first game entity.

11. The method of claim 8, further comprising effectuating presentation of an indication of the change in first game play metric of the first player in response to an indication that the player has an active communication session open with the one or more game servers.

12. The method of claim 8, wherein the amount of the change in the first game play metric decreases as an amount of time that the first player does not have an active communication session open with the one or more game servers increases.

13. The method of claim 8, wherein the first game play metric represents an indication of an amount of virtual currency held in credit for the first player.

14. The method of claim 8, wherein the first game play metric represents an indication of a rank of the first player compared to other players in the online racing game.

* * * * *